United States Patent
Song et al.

(10) Patent No.: US 9,749,156 B2
(45) Date of Patent: Aug. 29, 2017

(54) RECEIVING DEVICE AND METHOD OF MOBILE COMMUNICATION SYSTEM

(75) Inventors: Seong-Wook Song, Gwacheon-si (KR); Se-Jin Kong, Suwon-si (KR); Hun-Kee Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 961 days.

(21) Appl. No.: 12/999,769

(22) PCT Filed: Jun. 19, 2009

(86) PCT No.: PCT/KR2009/003297
§ 371 (c)(1),
(2), (4) Date: Dec. 17, 2010

(87) PCT Pub. No.: WO2009/154423
PCT Pub. Date: Dec. 23, 2009

(65) Prior Publication Data
US 2011/0085591 A1    Apr. 14, 2011

(30) Foreign Application Priority Data

Jun. 19, 2008 (KR) .......................... 10-2008-0057722

(51) Int. Cl.
H04L 25/00 (2006.01)
H04L 25/03 (2006.01)
H04L 25/02 (2006.01)

(52) U.S. Cl.
CPC .... H04L 25/03019 (2013.01); *H04L 25/0212* (2013.01); *H04L 2025/03598* (2013.01)

(58) Field of Classification Search
CPC ....... H04B 7/04; H04B 7/0684; H04B 1/7097
(Continued)

(56) References Cited

U.S. PATENT DOCUMENTS 4,365,338 A * 12/1982 McRae ................. H04B 7/015
375/230
4,996,647 A * 2/1991 Gasser ................... G01S 7/021
327/552
(Continued)

FOREIGN PATENT DOCUMENTS

JP     11-261452     9/1999
JP     2005-117235   4/2005
(Continued)

OTHER PUBLICATIONS

"Scrambling Code Generation for WCDMA on the StarCore SC140/SC1400 Cores", by Imran Ahmed, Freescale Semiconductor, Rev.1, Nov. 2004, pp. 2-9.*
(Continued)

*Primary Examiner* — Daniel Washburn
*Assistant Examiner* — Berhanu Tadese
(74) *Attorney, Agent, or Firm* — The Farrell Law Firm, P.C.

(57) ABSTRACT

An apparatus and a method for generating statistical signals having a characteristic similar to an input signal of a receiving apparatus to determine an optimized filter coefficient through an adaptive equalization algorithm are provided. The apparatus includes a channel estimator, a statistical signal generator, and an adaptive algorithm processor. The channel estimator estimates a channel of a reception signal. The statistical signal generator generates a plurality of signals having the same characteristic as that of a reception signal using a channel determined through a channel estimation process. The adaptive algorithm processor performs an adaptive equalization algorithm using the plurality of generated signals to determine an optimized filter coefficient.

10 Claims, 8 Drawing Sheets

(58) Field of Classification Search
USPC .................................. 375/232, 230; 455/450
See application file for complete search history.

(56) References Cited

U.S. PATENT DOCUMENTS

| | | | | |
|---|---|---|---|---|
| 6,201,843 B1* | 3/2001 | Kingston | .......... | H04L 25/03006 375/350 |
| 6,327,302 B1* | 12/2001 | Shen | .................. | H03H 21/0012 333/18 |
| 6,400,761 B1* | 6/2002 | Smee | ................ | H04L 25/03057 375/232 |
| 6,470,044 B1* | 10/2002 | Kowalski | ............. | H04B 1/7107 370/201 |
| 6,504,868 B1* | 1/2003 | Koizumi | ............... | H04L 25/025 375/231 |
| 6,522,683 B1* | 2/2003 | Smee | .................. | H04B 1/7097 375/144 |
| 6,693,958 B1* | 2/2004 | Wang | ..................... | H04H 40/18 348/726 |
| 7,646,807 B1* | 1/2010 | Manickam | ........ | H04L 25/03057 375/232 |
| 7,864,836 B1* | 1/2011 | Zhidkov | ............. | H04L 25/0216 375/229 |
| 2002/0161560 A1* | 10/2002 | Abe | ........................ | H04L 1/005 702/196 |
| 2003/0223489 A1* | 12/2003 | Smee | .................... | H04L 1/188 375/233 |
| 2004/0062302 A1* | 4/2004 | Fujii | ........................ | H04L 1/06 375/232 |
| 2004/0131109 A1* | 7/2004 | Kim | ..................... | H04B 1/7097 375/148 |
| 2004/0161057 A1* | 8/2004 | Malladi et al. | ................ | 375/340 |
| 2004/0203812 A1* | 10/2004 | Malladi | ................ | H04B 1/7105 455/450 |
| 2004/0203813 A1 | 10/2004 | Wei et al. | | |
| 2005/0074052 A1* | 4/2005 | Akada | ...................... | H04B 1/69 375/130 |
| 2005/0129105 A1* | 6/2005 | Papasakellariou | ..... | H04B 1/711 375/232 |
| 2005/0207477 A1* | 9/2005 | Monsen | ............... | H04B 1/7105 375/147 |
| 2006/0143549 A1* | 6/2006 | Yasumoto | ............... | H04L 1/244 714/704 |
| 2006/0199557 A1* | 9/2006 | Kimata | ................ | H04B 1/7097 455/213 |
| 2006/0215747 A1* | 9/2006 | Pietraski | ............ | H03H 21/0043 375/232 |
| 2007/0010203 A1* | 1/2007 | Wee | ..................... | H04B 1/7103 455/63.1 |
| 2007/0183489 A1* | 8/2007 | Zhidkov | ............ | H03M 13/256 375/229 |
| 2008/0107166 A1* | 5/2008 | Lee | ................... | H04L 25/03038 375/232 |
| 2008/0130733 A1* | 6/2008 | Ogawa | ................... | H04B 1/707 375/232 |
| 2009/0097539 A1* | 4/2009 | Furman | ............. | H04L 25/03019 375/232 |
| 2010/0158089 A1* | 6/2010 | Ki | ........................ | H04L 25/0212 375/224 |
| 2010/0158095 A1* | 6/2010 | Chung | ............. | H04L 25/03019 375/232 |

FOREIGN PATENT DOCUMENTS

| | | |
|---|---|---|
| KR | 100718078 | 5/2007 |
| KR | 1020070121755 | 12/2007 |
| KR | 1020090012181 | 2/2009 |

OTHER PUBLICATIONS

PCT/ISA/237 Written Opinion issued on PCT/KR2009/003297 (4 pp.).
Korean Office Action dated Jan. 29, 2015 issued in counterpart application No. 10-2008-0057722.
Korean Office Action dated May 1, 2015 issued in counterpart application No. 10-2008-0057722.
Korean Office Action dated Nov. 18, 2015 issued in counterpart application No. 10-2008-0057722, 6 pages.

* cited by examiner

| ALGORITHM | ANTENNA NUMBER | MULTIPLICATION | ADDITION |
|---|---|---|---|
| LMMSE | Tx:1,Rx:1 | $8N^3+4N^2$ | $8N^3+2N^2$ |
| | Tx:2,Rx:2 | $64N^3+16N^2$ | $64N^3+8N^2$ |
| LMS | Tx:1,Rx:1 | $8N+2$ | $8N$ |
| | Tx:2,Rx:2 | $32N+8$ | $32N$ |
| SRE-LMS | Tx:1,Rx:1 | $I\cdot(8N+2)$ | $I\cdot(8N)$ |
| | Tx:2,Rx:2 | $I\cdot(32N+8)$ | $I\cdot(32N)$ |
| SRE-LLMS | Tx:1,Rx:1 | $I\cdot(8N+2)$ | $I\cdot(8N+2)$ |
| | Tx:2,Rx:2 | $I\cdot(32N+8)$ | $I\cdot(32N+8)$ |

FIG.6

RECEIVING DEVICE AND METHOD OF MOBILE COMMUNICATION SYSTEM

PRIORITY

This application claims the benefit under 35 U.S.C. §119(a) of a Korean patent application filed in the Korean Intellectual Property Office on Jun. 19, 2008 and assigned Serial No. 10-2008-0057722, the contents of which are incorporated herein by reference.

BACKGROUND OF THE INVENTION

1. Field of the Invention

The present invention relates to an apparatus and a method for improving reception performance of a mobile communication system. More particularly, the present invention relates to an apparatus and a method for generating a statistical signal having a characteristic similar to that of an input signal of a receiving apparatus, and determining an optimized filter coefficient through an adaptive equalization algorithm.

2. Description of the Related Art

A mobile communication system uses various demodulation techniques between a base station and a mobile terminal in order to enable high-speed data transmission. For example, a mobile communication system (GSM/GPRS/EDGE) based on a Time Division Multiple Access (TDMA) scheme demodulates a reception signal using MLSD.

The MLSD has an excellent performance compared to other demodulation techniques but has a very high complexity, so that it is difficult to realize the MLSD in a broadband communication system. Accordingly, in the case where the MLSD is not applicable, a linear equalizer or a linear-feedback equalizer is used.

The linear equalizer includes a linear filter that maximizes a Signal-Interference Ratio (SIR) of a demodulation signal. The linear equalizer provides more excellent performance than a rake receiver, but has a more complicated structure than that of the rake receiver and consumes much power. The linear equalizer uses an adaptive equalization algorithm that calculates an optimized filter using an existing signal without estimating a channel and noise power, but the adaptive equalization algorithm obtains an optimized filter by performing a process for a predetermined time, that is, repeatedly performing a process for determining an existing signal in order to determine the optimized filter. Accordingly, the optimized filter cannot be obtained under a circumstance where a channel status frequently changes.

That is, the above-described reception method may apply an algorithm for determining an optimized filter coefficient under a static environment, but the adaptive equalization algorithm that determines an optimized filter coefficient cannot be applied under an environment of high speed movement where channel change frequently occurs.

Therefore, a receiving apparatus and a method for providing an excellent performance in the receiving apparatus and simultaneously measuring an optimized filter coefficient in the case where the receiving apparatus moves in high speed are required.

SUMMARY OF THE INVENTION

The present invention is designed to address at least the above-mentioned problems and/or disadvantages and to provide at least the advantages described below. Accordingly, an aspect of the present invention is to provide an apparatus and a method for improving a reception performance of a mobile communication system.

Another aspect of the present invention is to provide an apparatus and a method for improving a performance of an adaptive equalization algorithm of a mobile communication system.

Still another aspect of the present invention is to provide an apparatus and a method for generating a statistical signal for determining a filter coefficient through an adaptive equalization algorithm in a receiving apparatus of a mobile communication system.

Yet another aspect of the present invention is to provide an apparatus and a method for improving a reception performance using a statistical signal having a characteristic similar to that of an input signal of a receiving apparatus of a mobile communication system.

In accordance with an aspect of the present invention, a receiving apparatus of a mobile communication system is provided. The apparatus includes a channel estimator for estimating a channel of a reception signal, a statistical signal generator for generating a plurality of signals having the same characteristic as that of a reception signal using a channel determined through a channel estimation process, and an adaptive algorithm processor for performing an adaptive equalization algorithm using the plurality of generated signals to determine an optimized filter coefficient.

In accordance with another aspect of the present invention, a receiving method of a mobile communication system is provided. The method includes estimating a channel of a reception signal, generating a plurality of signals having the same characteristic as that of a reception signal using a channel determined through a channel estimation process, and performing an adaptive equalization algorithm using the plurality of generated signals to determine an optimized filter coefficient.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 6 is a table illustrating an amount of calculation of a receiving apparatus according to an exemplary embodiment of the present invention.

Throughout the drawings, like reference numerals will be understood to refer to like parts, components and structures.

DETAILED DESCRIPTION OF EMBODIMENTS
OF THE INVENTION

The following description with reference to the accompanying drawings is provided to assist in a comprehensive understanding of certain embodiments of the present invention as defined by the claims and their equivalents. It includes various specific details to assist in that understanding although these are to be regarded as merely exemplary. Accordingly, a person having ordinary skill in the art will recognize that various changes and modifications of the embodiments described herein can be made without departing from the scope and spirit of the present invention. Also, descriptions of well-known functions and constructions are omitted for clarity and conciseness.

Further the terms and words used in the following description and claims are not limited to the dictionary meanings, but are merely used by the inventor to enable a clear and consistent understanding of the present invention.

Exemplary embodiments of the present invention provide an apparatus and a method for generating a statistical signal having a characteristic similar to that of an input signal of a receiving apparatus and determining an optimized filter coefficient through an adaptive equalization algorithm in a mobile communication system.

FIG. 1 is a block diagram illustrating a receiving apparatus for performing an adaptive equalization algorithm using re-generation of a statistical signal according to an exemplary embodiment of the present invention.

Figure 1A:
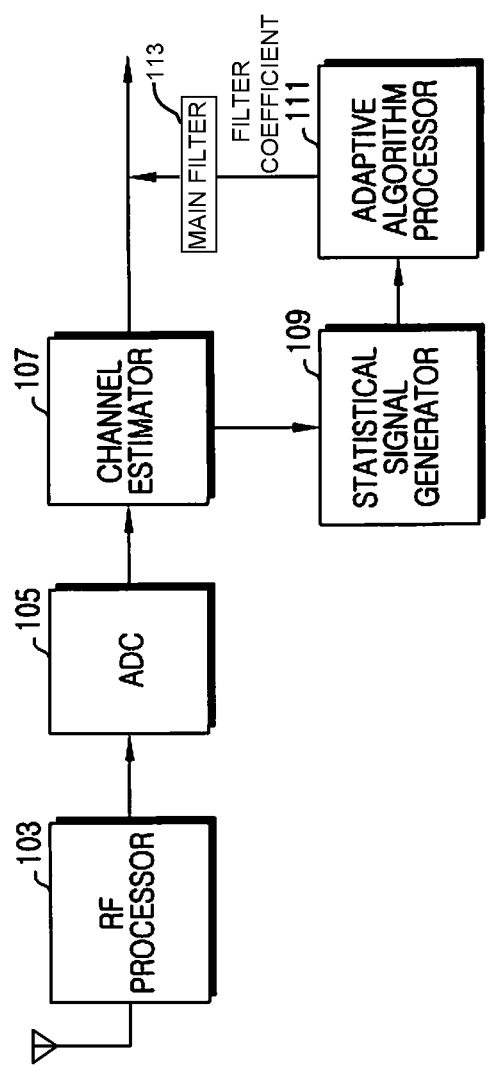
FIG. 1A is a block diagram illustrating a receiving apparatus according to an exemplary embodiment of the present invention.

FIG. 1A is a block diagram illustrating a receiving apparatus according to an exemplary embodiment of the present invention.

Referring to FIG. 1A, the receiving apparatus includes a Radio Frequency (RF) processor 103, an Analog-to-Digital Converter (ADC) 105, a channel estimator 107, a statistical signal generator 109, and an adaptive algorithm processor 111.

First, the RF processor 103 of the receiving apparatus includes a front end unit and a filter, and converts an RF signal received via an antenna 101 of the receiving apparatus into a baseband signal. The ADC 105 converts an analog baseband signal from the RF processor 103 into a digital signal.

The channel estimator 107 performs a channel estimation process on a time domain using a channel estimation coefficient calculated and stored in advance, and then performs a channel estimation process on a frequency domain to determine a channel response.

The statistical signal generator 109 generates a plurality of signals having the same characteristic as that of an input signal, which is a signal for determining an optimized filter of an adaptive equalizer, using the channel response determined by the channel estimator 107. Here, when determining a channel characteristic under an environment where the receiving apparatus moves in high speed, since a large number of samples is required compared to an environment where the receiving apparatus moves in low speed, the statistical signal generator 107 performs a process of generating a plurality of signals that generate a large number of samples in a short time.

The adaptive algorithm processor 111 performs an adaptive equalization algorithm using the plurality of signals generated by the statistical signal generator 109, that is, the plurality of signals having the same characteristic as that of an input signal of the receiving apparatus to obtain an optimized filter coefficient for a received signal. After that, the adaptive algorithm processor 111 provides the obtained optimized filter coefficient to a main filter 113 of the receiving apparatus.

Figure 1B:
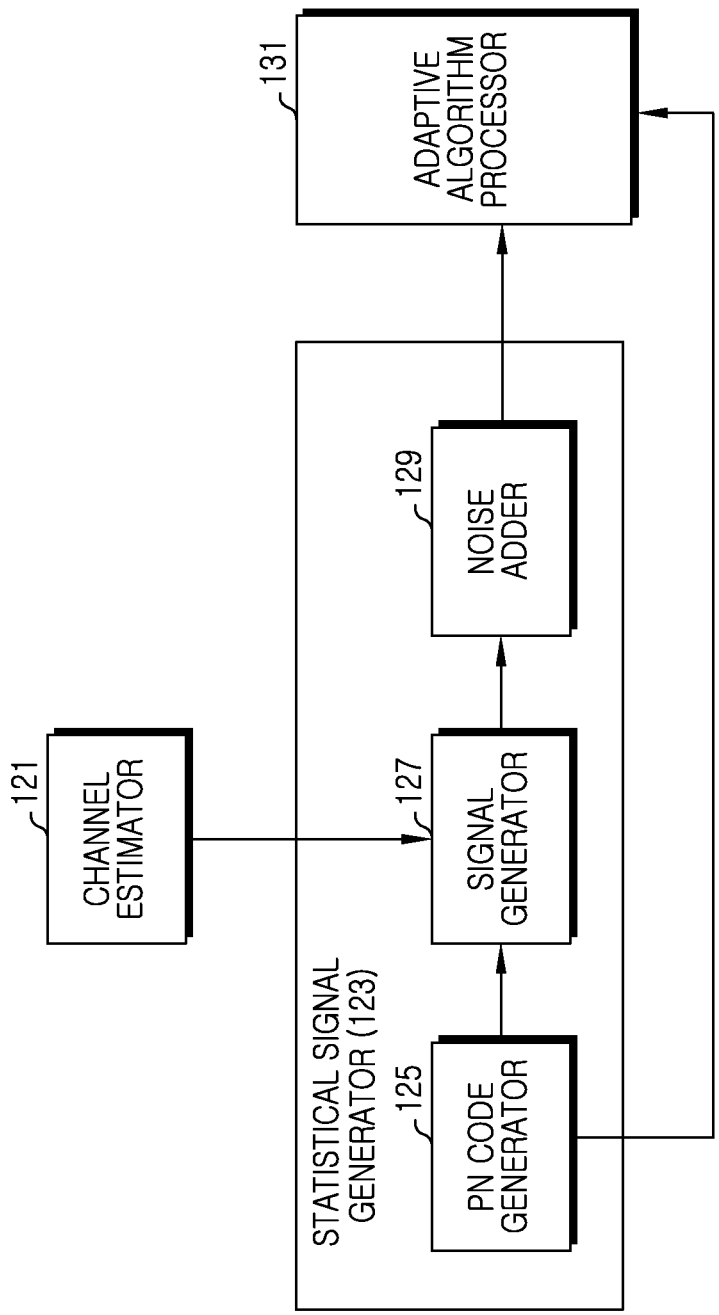
FIG. 1B is a block diagram illustrating a receiving apparatus according to an exemplary embodiment of the present invention.

FIG. 1B is a block diagram illustrating a receiving apparatus according to an exemplary embodiment of the present invention.

Referring to FIG. 1B, the receiving apparatus denotes a receiving apparatus that uses a general adaptive equalization algorithm.

A statistical signal generator 123 of the receiving apparatus that uses the general adaptive equalization algorithm may include a Pseudo Noise (PN) code generator 125, a signal generator 127, and a noise adder 129.

The statistical signal generator 123 generates statistical characteristic signals, which are a plurality of signals having the same characteristic as that of an input signal of the receiving apparatus using the channel response obtained by the channel estimator 121.

The statistical signal generator 123 is described below in more detail.

First, the PN code generator 125 of the statistical signal generator 123 generates an arbitrary signal ỹi for generating a plurality of statistical signals having the same characteristic as that of an input signal of the receiving apparatus. At this point, the PN code generator 125 may generate a signal of a binary code for making channel characteristic calculation simple.

After that, the statistical signal generator 123 allows the signal generator 127 to calculate H[n]d̃i using an arbitrary signal generated by the PN code generator 125 and a channel determined by a channel estimation process of the channel estimator 121.

After that, the statistical signal generator 123 generates a statistical signal having the same characteristic as that of an input signal of the receiving apparatus by allowing the noise adder 129 to add a noise to H[n]d̃i calculated by the signal generator 127. That is, the statistical signal generator 123 generates a statistical signal having the same characteristic as that of an input signal of the receiving apparatus using Equation (1) below.

$$\tilde{y}i = H[n]\tilde{d}i + \tilde{w}i \quad (1)$$

where ỹi is a signal generated by the statistical signal generator 123, that is, a statistical signal having the same characteristic as that of an input signal of the receiving apparatus, H[n]d̃i is a value calculated by the signal generator 127 of the statistical signal generator 123 and is sum of a channel response of the channel estimator and an arbitrary signal, and w̃i is noise power added by the noise adder 129.

After that, the receiving apparatus that uses the general adaptive equalization algorithm allows the adaptive algorithm processor 131 to obtain an optimized filter coefficient using a statistical signal generated by the statistical signal generator 123.

That is, when determining a channel characteristic of an environment of a high-speed movement, since the receiving apparatus requires a larger number of samples than an environment of a low-speed movement, the receiving apparatus is for supplementing a disadvantage of the adaptive equalization algorithm that requires a large number of samples in a short time to obtain an optimized filter coefficient fast and accurately.

Figure 1C:
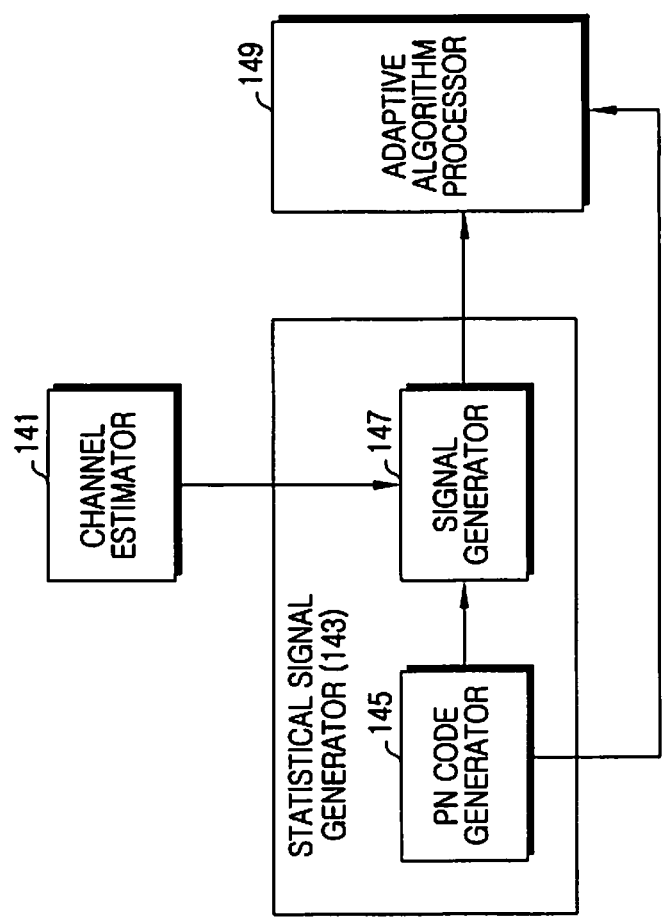
FIG. 1C is a block diagram illustrating a receiving apparatus according to an exemplary embodiment of the present invention.

FIG. 1C is a block diagram illustrating a receiving apparatus according to an exemplary embodiment of the present invention.

Referring to FIG. 1C, the receiving apparatus denotes a receiving apparatus that uses a Leaky adaptive equalization algorithm.

A statistical signal generator 143 of the receiving apparatus that uses the Leaky adaptive equalization algorithm includes a PN code generator 145 and a signal generator 147.

The statistical signal generator 143 performs an operation similar to that of the statistical signal generator 127 of the general adaptive equalization algorithm illustrated in FIG. 1B.

In more detail, the statistical signal generator 143 generates statistical signals, which are a plurality of signals having the same characteristic as that of an input signal of the receiving apparatus using a channel response obtained by a channel estimator 141.

First, the PN code generator 145 of the statistical signal generator 143 generates an arbitrary signal ŷi for generating a plurality of statistical signals having the same characteristic as that of an input signal of the receiving apparatus. At this point, the PN code generator 145 may generate a signal of a binary code for making channel characteristic calculation simple.

After that, the statistical signal generator 143 allows the signal generator 147 to calculate H[n]d̂i using a signal generated by the PN code generator 145 and a channel determined by a channel estimation process of the channel estimator 141.

At this point, unlike the receiving apparatus that uses the general adaptive equalization algorithm, the statistical signal generator 143 does not add noise power.

Since the receiving apparatus that uses the Leaky adaptive equalization algorithm includes a Leaky term, which is one of factors having an influence on a reception performance, as addition noise power, no separate step and apparatus for adding an addition noise are required.

Up to now, an apparatus for generating a statistical signal having a characteristic similar to that of an input signal of a receiving apparatus, and determining an optimized filter coefficient through an adaptive equalization algorithm in a mobile communication system has been described. Hereinafter, a method for generating a statistical signal having a characteristic similar to that of an input signal of a receiving apparatus and determining an optimized filter coefficient through the adaptive equalization algorithm in a mobile communication system using the above apparatus according to an exemplary embodiment of the present invention is described.

Figure 2:
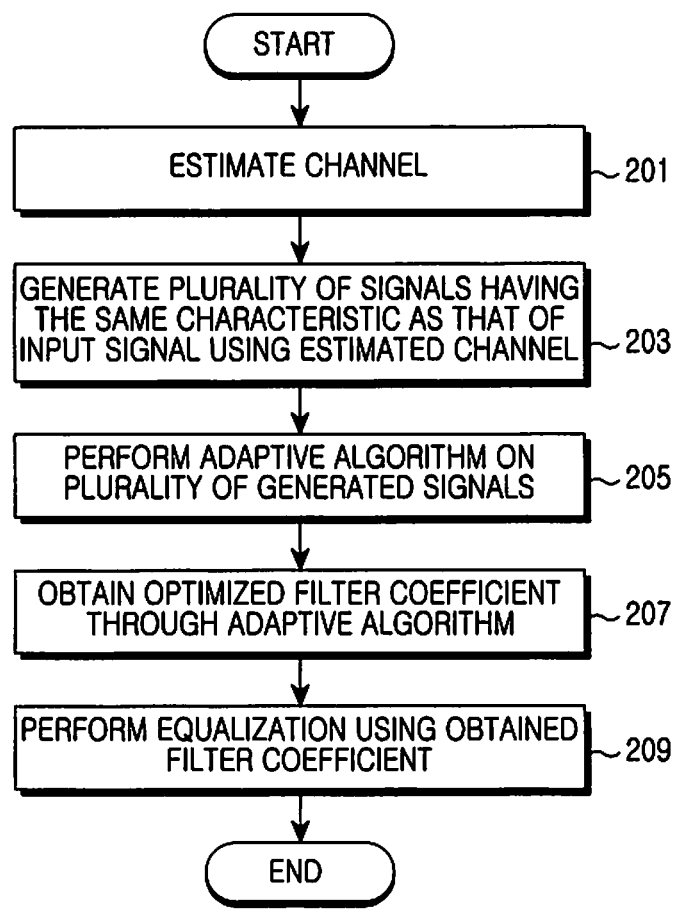
FIG. 2 is a flowchart illustrating a process for performing an adaptive equalization algorithm in a receiving apparatus according to an exemplary embodiment of the present invention.

FIG. 2 is a flowchart illustrating a process for performing an adaptive equalization algorithm in a receiving apparatus according to an exemplary embodiment of the present invention.

Referring to FIG. 2, the receiving apparatus performs a channel estimation process on a received signal in step 201. The receiving apparatus proceeds to step 203 to generate a plurality of signals having the same characteristic as that of an input signal using the channel estimated in step 201. Here, the process of generating a plurality of signals having the same characteristic as that of an input signal denotes a process of generating a large number of samples in a short time since when determining a channel characteristic under an environment of a high-speed movement, the receiving apparatus requires a larger number of samples than an environment of a low-speed movement. That is, the plurality of signals denote signals for determining an optimized filter of an adaptive equalizer.

In addition, the receiving apparatus may generate a plurality of signals having the same characteristic as that of an input signal in the following method according to an exemplary embodiment of the present invention.

That is, the receiving apparatus may perform different processes to generate the signals in case of using the general adaptive equalization algorithm and in case of using the Leaky adaptive equalization algorithm, respectively.

First, in the case where the receiving apparatus uses the general adaptive equalization algorithm, the receiving apparatus allows a statistical signal generator to sum a channel response obtained by a channel estimator of the receiving apparatus and an arbitrary input signal, and generate statistical signals, which are a plurality of signals having the same characteristic as that of an input signal. Here, the statistical signal generator includes a PN code generator 125 for generating an arbitrary input signal (arbitrary binary signal), the signal generator 127 for summing a channel response obtained by the channel estimator and the arbitrary input signal, and a noise adder 129 for adding an addition noise to a signal generated by the signal generator.

Next, in the case where the receiving apparatus uses the Leaky adaptive equalization algorithm, like the case of using the general adaptive equalization algorithm, the receiving apparatus allows a statistical signal generator to generate a plurality of statistical signals having the same characteristic as that of an input signal using a channel response obtained by a channel estimator. Here, since the receiving apparatus that uses the Leaky adaptive equalization algorithm includes a Leaky term, which is one of factors having an influence on a reception performance, as addition noise power, no separate step and apparatus for adding an addition noise are required.

The receiving apparatus performs an adaptive equalization algorithm on the plurality of generated signals in step 205. Step 205 is a step for supplementing a disadvantage of an equalizer that uses the adaptive equalization algorithm. In other words, since the conventional adaptive equalization algorithm may obtain a proper filter coefficient after performing an operation for a predetermined time or more in order to obtain an optimized filter coefficient, in the case where a channel environment is poor, an optimized filter coefficient cannot be obtained. To solve the above problem, exemplary embodiments of the present invention perform an adaptive equalization algorithm on a plurality of signals having the same characteristic as that of an input signal in order to obtain an optimized filter coefficient.

The receiving apparatus obtains an optimized filter coefficient through the adaptive equalization algorithm in step 207, and proceeds to step 209 to perform an equalization process using the filter coefficient obtained in step 207.

After that, the receiving apparatus ends the present algorithm.

That is, the receiving apparatus that uses the adaptive equalization algorithm may obtain an optimized filter coefficient under an environment of a high-speed movement by generating a plurality of signals having the same characteristic as that of an input signal in order to determine a channel characteristic under the environment of the high-speed movement.

FIGS. 3 to 6 are graphs illustrating performance of a receiving apparatus according to an exemplary embodiment of the present invention.

FIG. 3 is a graph illustrating a reception performance of a receiving apparatus having one antenna.

Figure 3A:
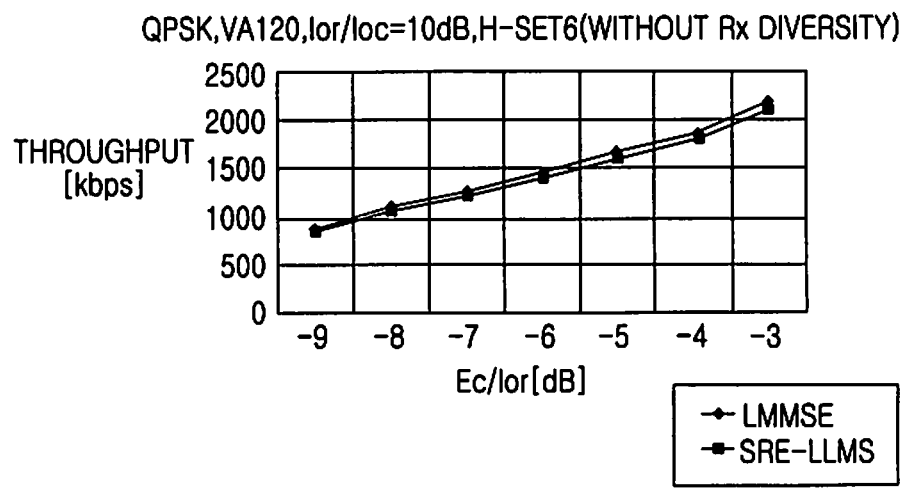
FIG. 3 is a graph illustrating a reception performance of a receiving apparatus having one antenna.
Figure 3B:
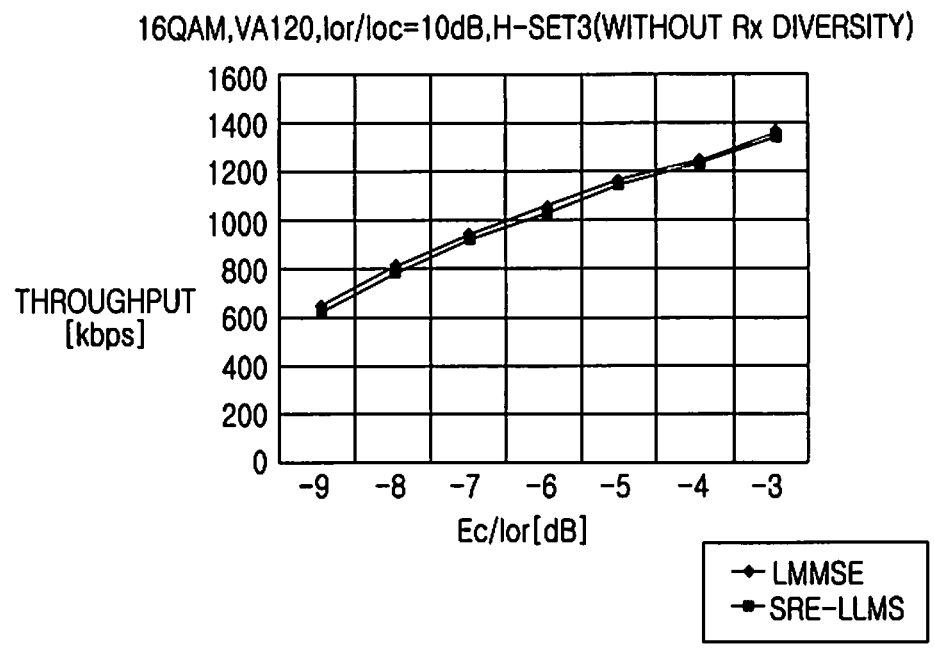

Referring to FIG. 3, FIGS. 3A and 3B illustrate reception performance under an environment where the receiving apparatus having one antenna moves at speed of about 120 Km. The reception performance under the environment (SRE-LMS) where high-speed movement is made using the receiving apparatus according to the present invention has improved and become similar to the performance of an LMMS algorithm.

FIG. 4 is a graph illustrating a reception performance of a receiving apparatus having two antennas.

Figure 4A:
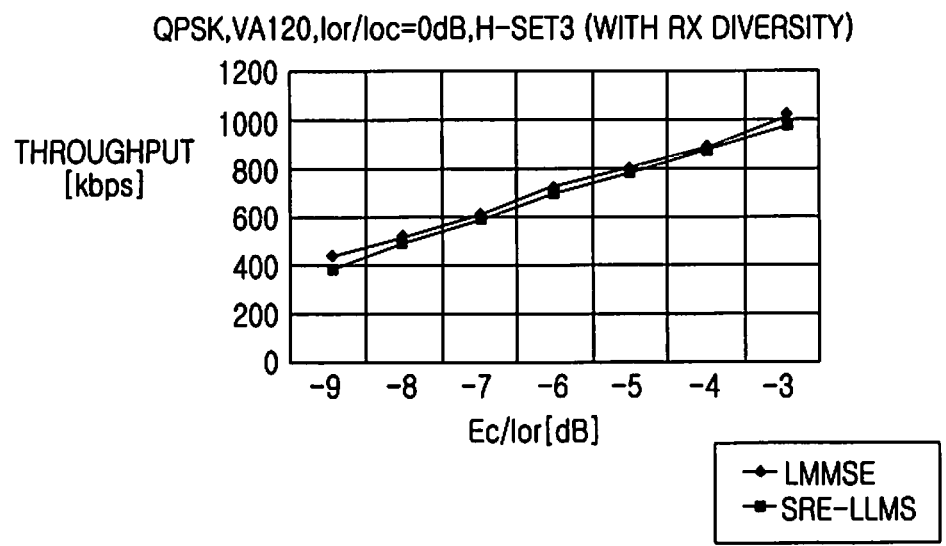
FIG. 4 is a graph illustrating a reception performance of a receiving apparatus having two antennas.
Figure 4B:
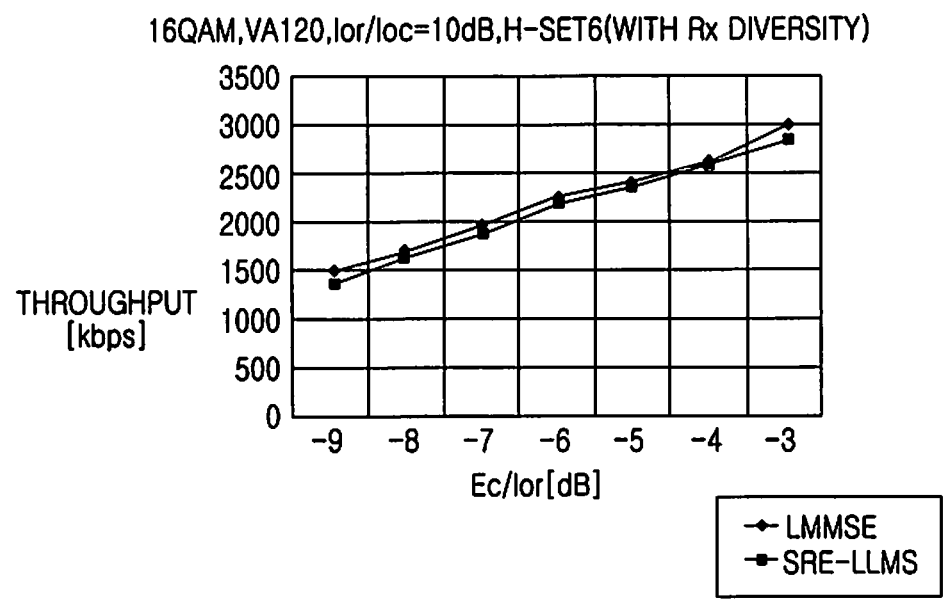

Referring to FIG. 4, FIGS. 4A and 4B illustrate reception performance under an environment where the receiving apparatus having two antennas moves at speed of about 120 Km. The reception performance under the environment (SRE-LMS) where high-speed movement is made using the receiving apparatus according to the present invention has improved and become similar to the performance of an LMMS algorithm.

FIG. 5 is a graph illustrating a performance required for a receiving apparatus according to an exemplary embodiment of the present invention.

Figure 5A:
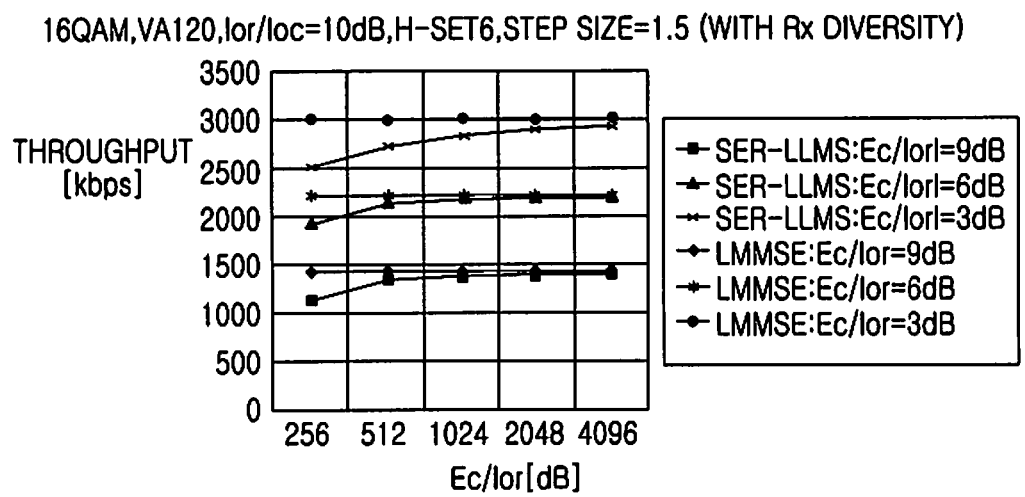
FIG. 5 is a graph illustrating a performance required for a receiving apparatus according to an exemplary embodiment of the present invention.
Figure 5B:
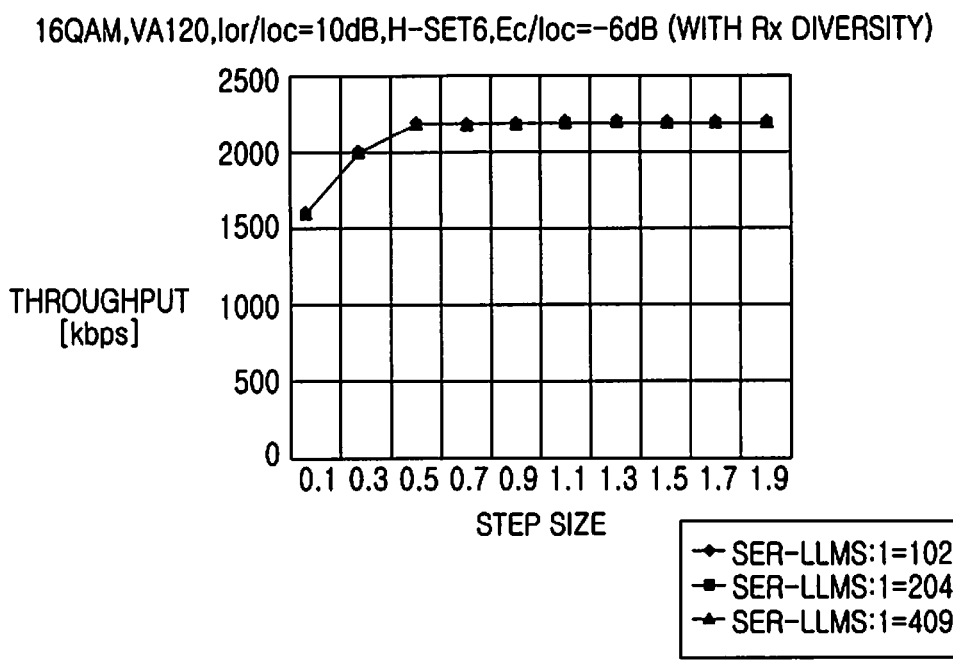

Referring to FIG. 5, FIG. 5A illustrates iteration calculated step by step and required by a receiving apparatus according to an exemplary embodiment of the present invention. It is revealed that the receiving apparatus requires iteration of a high-speed (120 km/h) by about 1024. FIG. 5B illustrates performance by a step size of the receiving apparatus according to an exemplary embodiment of the present invention.

FIG. 6 is a table illustrating an amount of calculation of a receiving apparatus according to an exemplary embodiment of the present invention.

Referring to FIG. 6, when an amount of calculation (SRE-LMS, SRE-LMMSE) of a receiving apparatus according to an exemplary embodiment of the present invention is compared to an amount of calculation (LMS, LMMSE) of a general receiving apparatus, it is revealed that the amount of calculation of the receiving apparatus according to an exemplary embodiment of the present invention is small. Therefore, the receiving apparatus according to an exemplary embodiment of the present invention is suitable for high-speed data mobile communication.

As described above, exemplary embodiments of the present invention provide an apparatus and a method for improving a reception performance using a statistical signal having a characteristic similar to that of an input signal of a receiving apparatus. The apparatus and method may supplement a disadvantage of an adaptive equalization algorithm that requires a large number of samples in a short time to obtain an optimized filter coefficient fast and accurately by determining the optimized filter coefficient through the adaptive equalization algorithm using the generated statistical signal.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A receiving apparatus in a wireless environment, the receiving apparatus comprising:
   a channel estimator configured to determine a channel response between the receiving apparatus and a transmitting apparatus by using a first signal received from the transmitting apparatus;
   a statistical signal generator configured to generate a plurality of second signals by respectively adding a plurality of arbitrary signals to the determined channel response, wherein a characteristic of each of the plurality of second signals is statistically identical to a characteristic of the first signal;
   an adaptive algorithm processor configured to determine a filter coefficient by performing an adaptive equalization algorithm based on the plurality of second signals and the plurality of arbitrary signals, and to determine the filter coefficient within a predetermined time in an environment where channel change frequently occurs; and
   a main filter configured to generate an output signal by filtering the first signal based on the determined filter coefficient,
   wherein each of the plurality of arbitrary signals is a binary sequence,
   wherein the predetermined time is required for determining an optimized filter coefficient, and
   wherein the first signal is a training signal for determining the channel response.

2. The apparatus of claim 1, wherein the statistical signal generator is further configured to:
   generate the plurality of arbitrary signals;
   generate a plurality of third signals by respectively adding the plurality of arbitrary signals to the channel response; and
   generate the plurality of second signals by respectively adding noise power to the plurality of third signals.

3. The apparatus of claim 2, wherein the second signal is generated by the following Equation:

$$\tilde{y}i = H[n]\tilde{d}i + \tilde{w}i$$

where $\tilde{y}i$ indicates each of the plurality of second signals, $H[n]\tilde{d}i$ indicates each of the plurality of third signals, and $\tilde{w}i$ indicates the noise power.

4. The apparatus of claim 1, wherein the channel estimator is further configured to determine the channel response by performing a channel estimation process on a time domain and a frequency domain based on a channel estimation coefficient.

5. The apparatus of claim 1, wherein the binary sequences comprise pseudo noise (PN) sequences.

6. A method for operating a receiving apparatus in a wireless environment, the method comprising:
   determining a channel response between the receiving apparatus and a transmitting apparatus by using a first signal received from the transmitting apparatus;
   generating a plurality of second signals by respectively adding a plurality of arbitrary signals to the determined channel response, such that an adaptive algorithm processor of the receiving apparatus determines a filter coefficient within a predetermined time in an environment where channel change frequently occurs, wherein a characteristic of each of the plurality of second signals is statistically identical to a characteristic of the first signal;

determining the filter coefficient by performing an adaptive equalization algorithm based on the plurality of second signals and the plurality of arbitrary signals, and generating an output signal by filtering the first signal based on the determined filter coefficient, wherein each of the plurality of arbitrary signals is a binary sequence, wherein the predetermined time is required for determining an optimized filter coefficient, and wherein the first signal is a training signal for determining the channel response.

7. The method of claim 6, wherein generating the plurality of second signals comprises:

generating the plurality of arbitrary signals;

generating a plurality of third signals by respectively adding the plurality of arbitrary signals to the channel response; and generating the plurality of second signals by respectively adding noise power to the plurality of third signals.

8. The method of claim 7, wherein the second signal is generated by the following Equation:

$$\tilde{y}i = H[n]\tilde{d}i + \tilde{w}i$$

where $\tilde{y}i$ indicates each of the plurality of second signals, $H[n]\tilde{d}i$ indicates each of the plurality of third signals, and $\tilde{w}i$ indicates the noise power.

9. The method of claim 6, wherein determining the channel response comprises performing a channel estimation process on a time domain and a frequency domain based on a channel estimation coefficient.

10. The method of claim 6, wherein the binary sequences comprise pseudo noise (PN) sequences.

* * * * *